Figure 1:
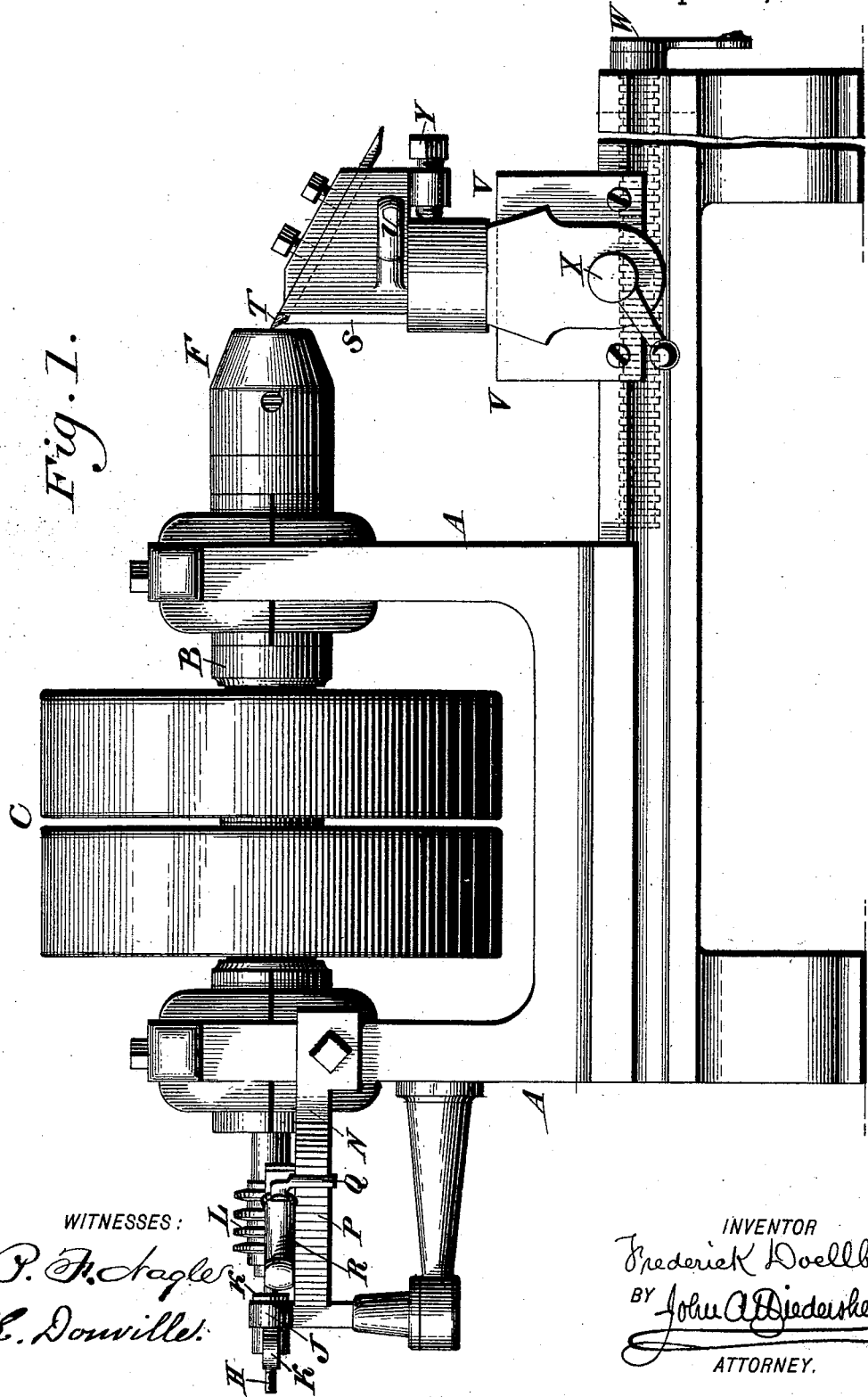

(No Model.) 2 Sheets—Sheet 1.

F. DOELLBOR.
MACHINE FOR TURNING PEARL OR OTHER BUTTONS.

No. 495,314. Patented Apr. 11, 1893.

WITNESSES:
P. F. Nagle
L. Douville

INVENTOR
Frederick Doellbor.
BY John A. Diederheim
ATTORNEY.

(No Model.) 2 Sheets—Sheet 2.
F. DOELLBOR.
MACHINE FOR TURNING PEARL OR OTHER BUTTONS.
No. 495,314. Patented Apr. 11, 1893.
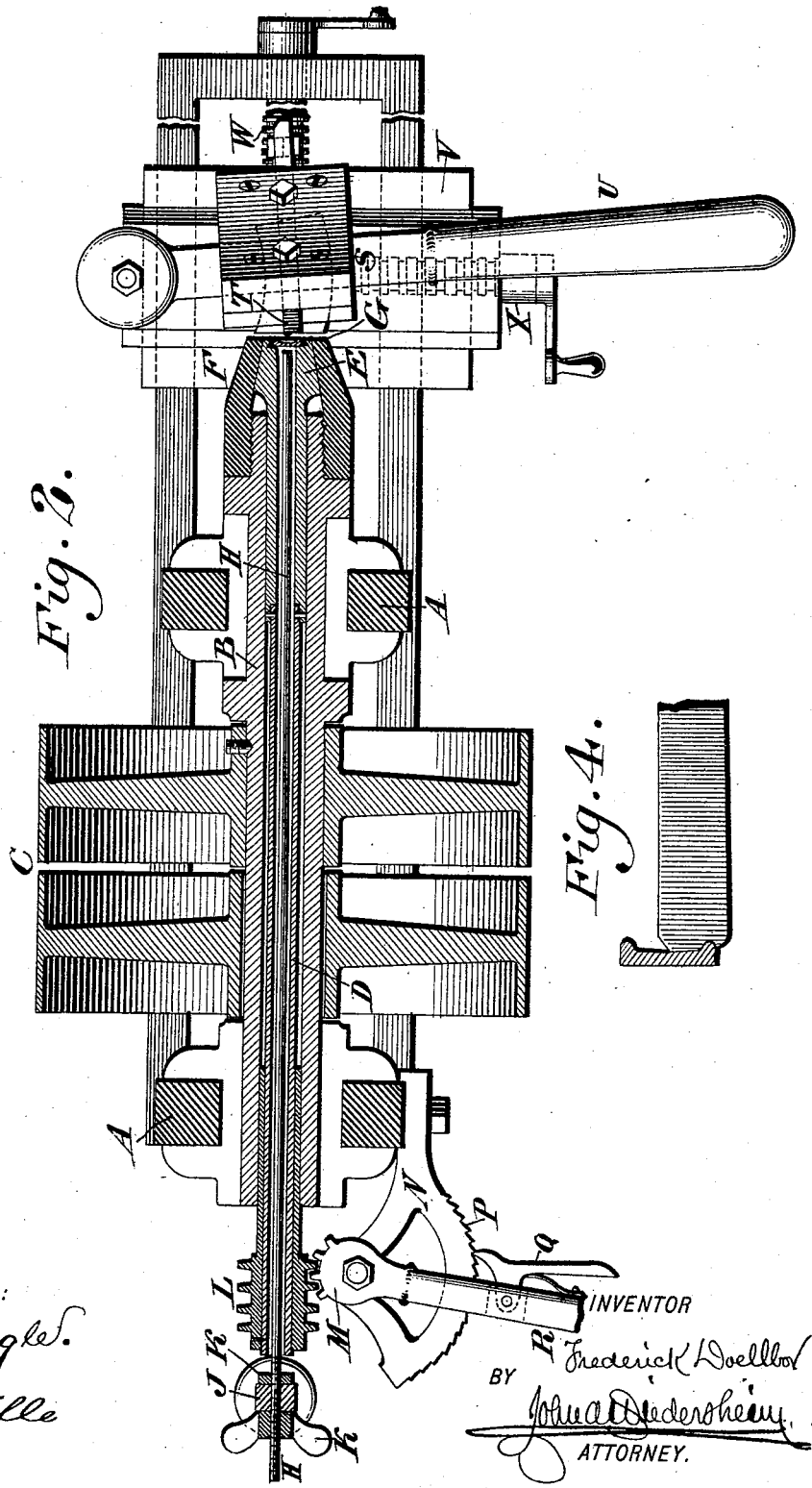

UNITED STATES PATENT OFFICE.

FREDERICK DOELLBOR, OF PHILADELPHIA, PENNSYLVANIA.

MACHINE FOR TURNING PEARL OR OTHER BUTTONS.

SPECIFICATION forming part of Letters Patent No. 495,314, dated April 11, 1893.

Application filed March 3, 1892. Serial No. 423,591. (No model.)

*To all whom it may concern:*

Be it known that I, FREDERICK DOELLBOR, a citizen of the United States, residing in the city and county of Philadelphia, State of Pennsylvania, have invented a new and useful Improvement in Machines for Turning Pearl or other Buttons, which improvement is fully set forth in the following specification and accompanying drawings.

My invention consists of a machine for turning pearl or other buttons, the same embodying a novel chuck for holding the blank, means for opening the chuck and releasing the button.

It also consists of a tool or cutter of novel construction and adjustment, and other features as will be hereinafter set forth.

Figure 1 represents a side elevation of a machine for turning pearl and other buttons, embodying my invention. Fig. 2 represents a longitudinal section thereof. Fig. 3 represents side and end views of one member of a chuck employed. Fig. 4 represents a side elevation of the tool or cutter employed.

Similar letters of reference indicate corresponding parts in the several figures.

Referring to the drawings: A designates the frame of the machine on which is mounted the hollow mandrel B, the latter having loose and fixed pulleys C for evident purposes. Within the mandrel is the sliding tubular stem D, the forward end of which carries the split or expansible and contractible head E, which is inclosed by the head F attached to the corresponding end of the mandrel B, said heads E and F constituting a chuck. The outer face of the head E and the inner face of the head F are angular, so that they may rotate together when so required, and said faces are also made conical or tapering, so that when the head E recedes from the head F, the former is free from contact with the latter, and so is permitted to expand in order to release the button or button head previously held by the chuck, as will be hereinafter more fully explained, it being noticed that the forward end of the head E has a recess G therein to receive the blank from which the button or button head is formed.

Within the stem D is a stationary spindle or throw-off H, the same also passing through the head E so as to approach the recess G, and thus strike the back of the button head when so required The spindle H is held at the end opposite to the recess G by means of an arm J on the frame A, and nuts K on the spindle on opposite sides of said arm, thus also providing means for setting or adjusting the spindle relatively to the recess G.

To the end of the stem D, adjacent to the arm J is screwed or otherwise firmly attached a circular rack L, with which engages the toothed segment M, the latter being mounted on the arm N of the frame A, said arm having a ratchet P for engagement with a pawl Q on the handle or lever R of the head M by which provision the stem D may be moved in opposite directions and locked when required.

S designates the carrier or rest of the tool or cutter T, opposite to the chuck, said carrier being connected with the lever U, whose axis is on the carriage V, the latter supporting said carrier S, and said carriage being adapted to move in longitudinal and transverse directions by means of the screws W and X, whereby the cutter may be adjusted relatively to the adjacent end of the chuck.

Mounted on the under side of the carrier S is a screw Y which is arranged horizontally and adapted to abut against the adjacent side of the carriage V, whereby the advance of the cutter against the blank may be limited and adjusted with the greatest nicety relatively to said blank.

The face of the cutter is of the contour of that of the button head to be formed, and it is of a dimension about one-half that of the diameter of said head, it being also slanting so that the cutting is gradual, beginning from center to circumference.

The operation is as follows:—The stem is withdrawn by the action of the lever R, whereby the head E expands. A blank is then placed in the recess G, and the lever R again operated to advance the stem, whereby the head E, moves against the head F, and is thereby contracted or the chuck closed, so that the blank is firmly held or clamped by the head E, and it rotates with the chuck owing to power being applied to the mandrel B, it being noticed that the spindle H remains stationary. The tool is now advanced against the blank by the operation of the handle U, whereby it turns the blank and converts it into a button head, see Fig. 4, the extent of cutting or turning of the tool being limited by the bolt or screw Y, as has been stated. The stem D is now drawn back, and the head E as it leaves the head F, expands, and the blank strikes the spindle H, whereby it is thrown out, and may be suitably collected. The tool is also withdrawn, and a new blank may be inserted into the expanded head E, after which the latter is again advanced, and said head closed on the blank, the subsequent operations being similar to those hereinbefore stated. The recess G is conical in its nature the narrowest end being in front so that when the head E is closed, the wall of said recess grasps the blank and holds it tightly while being subjected to the turning operation.

As the carrier S may be set nearer to or farther from the chuck by means of the screw W, and said carrier is attached to the lever U, the tool T may be presented to the blank at different angles, and thus cut deep or shallow grooves into the blank as required.

Having thus described my invention, what I claim as new, and desire to secure by Letters Patent, is—

1. A button turning machine having a frame, a rotatable hollow mandrel journaled thereon, having a detachable head, a sliding tubular stem having an expansible head inclosed by said detachable head of the mandrel, and an adjustable spindle within said tube, said stem and mandrel heads having angular contact faces, substantially as described.

2. A button turning machine consisting of a frame, a rotatable hollow mandrel journaled thereon, and having a detachable head, a tubular stem with an expansible head inclosed by said mandrel head, and having a recess in its forward end, an adjustable spindle in said tube, mechanism connected with said frame for operating said tube, and a tool holder secured on said frame, said parts being combined substantially as described.

3. A frame, a hollow mandrel journaled thereon, and having an inclosing head at one end, a tubular stem within said mandrel having an expansible head at one end within said inclosing head, an adjustable spindle within said tubular stem and expansible head, and means substantially as described for sliding said tubular stem and expansible head, said parts being combined substantially as described.

FREDERICK DOELLBOR.

Witnesses:
JOHN A. WIEDERSHEIM,
R. H. GRAESER.